Aug. 14, 1928.

E. KLOSS 1,680,419

VARIABLE SPEED SET

Filed April 30, 1926

WITNESSES:
R. S. Williams
O. B. Buchanan

INVENTOR
Ernst Kloss
BY
Wesley G. Carr
ATTORNEY

Patented Aug. 14, 1928.

1,680,419

UNITED STATES PATENT OFFICE.

ERNST KLOSS, OF FALKENSEE, NEAR SPANDAU, GERMANY, ASSIGNOR TO WESTINGHOUSE ELECTRIC & MANUFACTURING COMPANY, A CORPORATION OF PENNSYLVANIA.

VARIABLE-SPEED SET.

Application filed April 30, 1926, Serial No. 105,759, and in Germany July 17, 1925.

My invention relates to controlling means and it has particular relation to means for controlling the interpole excitation, during sudden speed changes, of a rotary converter which is utilized in a variable speed set, as in a Kramer cascade induction motor set.

In all variable speed induction motor sets which utilize a rotary converter for interchanging variable amounts of power with the secondary member of the motor to control its speed, the inertia of the rotary converter influences its commutation, if the speed is varied quickly. In such case, the rotary converter will have unbalanced currents, due to its retardation or acceleration, so that the armature reactions of the direct and alternating currents do not substantially neutralize each other, as in the case of normal conditions of operation, and there remains an excess which either unduly strengthens or unduly weakens the commutating field and affects commutation. To avoid the foregoing difficulties, prior practice has led to the utilization of high-reluctance commutating pole pieces or to the entire omission of the same, but this has made it necessary to make the rotary converter much larger, in order to reduce the reactance voltage to such value as could be taken care of without commutating poles.

My present invention avoids the drawbacks of the foregoing designs by retaining the commutating poles, with their usual function, and providing means for varying the commutating field in accordance with variations in the ratio between the alternating current and direct current in the rotary converter.

Figure 1:
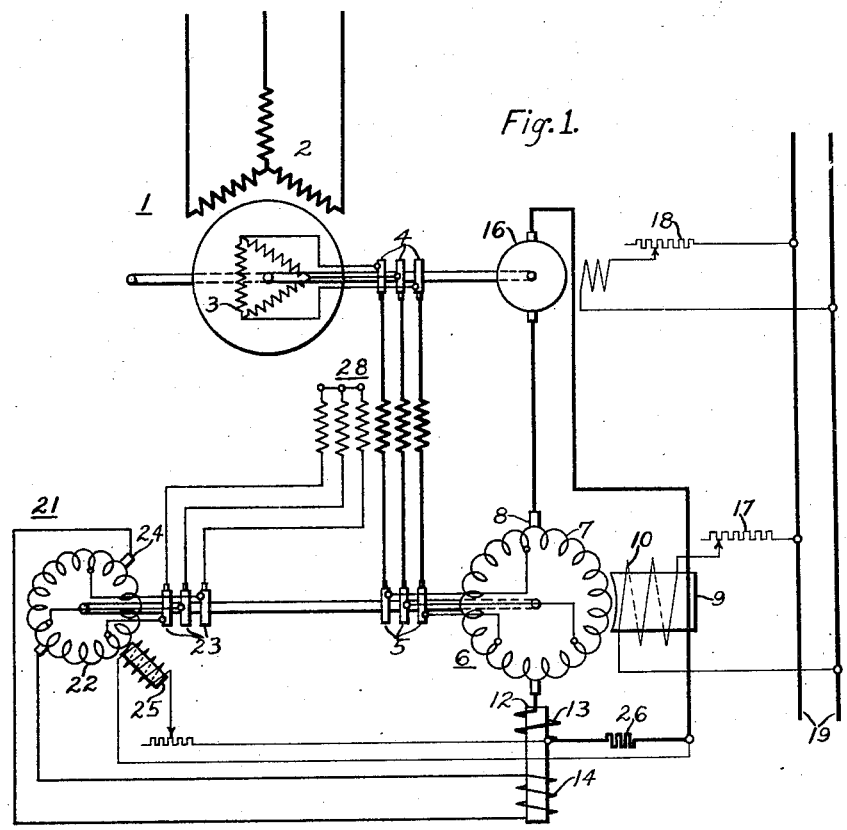
Figure 2:
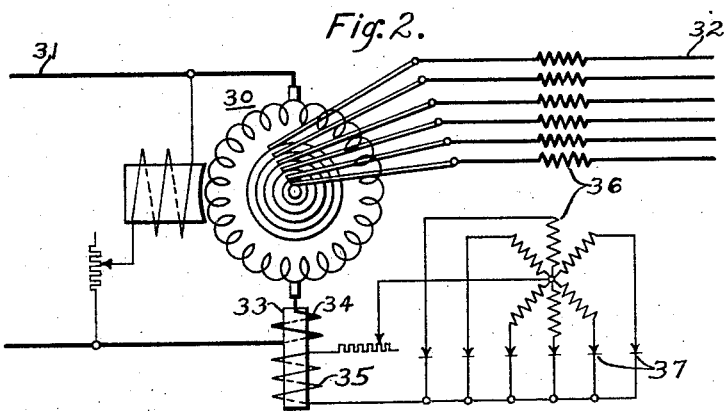

With the foregoing and other objects in view, my invention consists in the combinations and the methods hereinafter described and claimed, with reference to the accompanying drawing, wherein Figure 1 is a diagrammatic view of circuits and apparatus embodying my invention in a Kramer cascade induction motor set, with an auxiliary machine for supplying the corrective excitation for the interpolar members of the rotary converter which is connected in the secondary circuit of the main induction motor, and Figure 2 is a diagrammatic view of apparatus and circuits embodying my invention, in a slightly modified form, in a rotary converter of more general application.

In the Kramer cascade induction motor set shown in Fig. 1, I provide a main induction motor 1 having stator windings 2 and rotor windings 3, the latter being connected to slip rings 4. The slip rings 4 of the induction motor deliver current to the slip rings 5 of a rotary converter 6, having an armature winding 7 which is connected to a commutator cooperating with direct-current brushes 8, and having main field pole pieces 9 with exciting windings 10 thereon and interpole pieces 12 with main and auxiliary commutating windings 13 and 14 thereon. The main interpole windings 13 are connected in series with the direct-current leads of the rotary converter and the auxiliary interpole windings 14 are separately excited from a special source, as hereinafter described.

Any means, known in the art, may be utilized for causing the rotary converter to interchange power, of varying amounts, with the secondary member of the main induction motor. In the system shown in the drawings, a variable-voltage direct-current motor 16, which is connected, in this instance, to the shaft of the main induction motor 1, is permanently connected in circuit with the direct-current brushes 8 of the rotary converter. The exciting field windings of both the rotary converter and the direct-current motor may be variably energized, through suitable field rheostats 17 and 18, from a direct-current line 19.

The current for the auxiliary interpole winding 14 is supplied by an auxiliary machine 21 which comprises a rotor member mounted on the same shaft as the rotary converter 6 and having a rotor winding 22 which is connected to slip rings 23 and to a commutator member cooperating with direct-current brushes 24. The auxiliary machine is also provided with a direct-current stator field member 25 comprising a winding which is excited in accordance with the direct current in the rotary converter 6. Any convenient means, known in the art, may be utilized for providing the excitation, just described, for the direct-current field member of the auxiliary machine. For illustrative purposes, I have indicated the exciting winding of the auxiliary machine as being connected across a resistance shunt 26 which is connected in series with the direct-current leads of the rotary converter 6.

The slip ring 23 of the auxiliary machine are energized by means of a series transformer 28 which is connected in the alternating-current leads of the rotary converter 6. It will be noted that the phase position of the rotor member of the auxiliary machine 21 is fixed by the position, in space, of the rotor member of the rotary converter 6. The arrangement is such that the armature-reaction field, resulting from the alternating-current flowing through the slip rings 23 of the auxiliary machine, is stationary in space and is substantially in alinement with, and directly opposed to, the direct-current exciting field of the stator member 25. In order to maintain the field alinement just mentioned, it will be understood that the excitation of the main field winding 10 of the rotary converter 6 will be carefully adjusted for approximately unity-power-factor operation, as the phase position of the rotor member of the rotary converter, with respect to the phase position of the alternating currents therein, varies with the power factor.

It will be observed that the auxiliary machine 21 supplies the auxiliary interpole winding of the rotary converter 6 with a direct current which is proportional to the speed of the rotary converter, and hence the slip frequency of the main induction motor 1, and which is also proportional to the algebraic sum of the direct-current field excitation and the alternating-current armature-reaction excitation of the auxiliary machine.

The main interpole winding 13 of the rotary converter 6 may have such a number of ampere turns as to neutralize the preponderance of the direct-current armature reaction over the alternating-current armature reaction of the rotary converter in the commutating zone, and also to supply a few additional ampere turns to provide a suitable commutating field, as is customary in the art. The auxiliary machine 21 will then be designed so that the direct-current and alternating-current excitations exactly neutralize each other, during normal operating conditions, when the speed is not changing, so that the auxiliary commuting-pole winding 14 will be energized, in the one direction or the other, only when the rotary converter is accelerating or decelerating.

As an alternative utilization of the apparatus herein described, the main commutating pole winding 13 may be provided with the ampere turns which are necessary merely to provide the field necessary for commutation, whereupon the auxiliary machine 21 will be so designed that its direct-current excitation and its alternating-current armature reaction are not exactly neutralized, during normal operation, but only approximately neutralized, as is the case with the direct and alternating current armature reaction in the commutating zone of the rotary converter 6. The auxiliary commutating winding 14 will thus serve to neutralize the resultant armature reaction in the rotary converter 6 under all conditions of either steady-speed operation or varying-speed operation.

Other variations in the adjustment of the relative ampere turns, and in the distribution of the functions, of the commutating windings 13 and 14 will readily suggest themselves to the skilled workers of the art. My preferred arrangement is that first described, whereby the auxiliary dynamo-electric machine 21 delivers no currents whatsoever during the constant-speed operation of the rotary converter.

From the foregoing description of the speed-changing set shown in Fig. 1, it will be perceived that, when the speed of the set is changed, as by varying the field rheostat 18 of the direct-current motor 16, the rotary converter 6 will be caused to accelerate or decelerate, thus momentarily operating as an alternating-current motor or as a direct-current generator for producing such acceleration or deceleration, whereby the normal ratio between the direct-current and alternating-current armature reactions in the commutating zone of the rotary converter are disturbed. By the means shown in Fig. 1, however, the variation in the armature reaction of the rotary converter, resulting from the variation of the speed of operation, will be compensated for by means of the auxiliary machine 21 and the auxiliary commutating winding 14.

My invention is of general application to rotary converters, even when they are connected to direct-current alternating-current lines of supposedly constant potential and frequency, because, when sudden variations in the load occur, as upon the occurrence of a short circuit or the tripping of a circuit breaker, the rotary converter will be called upon to readjust the phase position angle of its rotor member and, for this purpose, it will have to momentarily accelerate or decelerate.

In Fig. 2, therefore, I have illustrated my invention as applied to a rotary converter 30 which is connected between a direct-current line 31 and an alternating-current line 32. The rotary converter is provided with an interpole member 33 which is excited by a series direct-current commutating winding 34 and an auxiliary commutating winding 35 which is excited from a series transformer 36 in the alternating-current leads and a bank of rectifiers, symbolically represented at 37, whereby a direct-current is produced which is exactly proportional to the alternating current in the rotary converter. The relative ampere turns of the direct-current and alternating current commutating windings 34 and 35 are so adjusted as to maintain the proper commutating conditions at all times, as will be understood from the foregoing explanation of the operation of the system shown in Fig. 1.

It will be noted that the corrective interpole excitation which is provided for the rotary converter by the auxiliary machine 21 of Fig. 1 is proportional to the speed, and hence the frequency, as well as being proportional to the difference between the direct and alternating currents of the rotary converter, whereas the interpole excitation provided by the apparatus shown in Fig. 2 is responsive to current values alone, whereby the direct-current and alternating-current armature reactions in the commutating zone of the rotary converter are independently neutralized by the direct and alternating currents themselves and, at the same time, a suitable commutating field is provided in the commutating zone.

I claim as my invention:

1. The combination with a rotary converter, of means for deriving a current responsive to the unneutralized difference between the alternating current and the direct current of said rotary converter, said means comprising an auxiliary dynamo-electric machine, means for exciting said auxiliary machine in response to the alternating current of said rotary converter, and means for exciting said auxiliary machine in response to the direct current of said rotary converter, the two excitations normally substantially neutralizing each other when the load conditions of the rotary converter are not rapidly changing.

2. The combination with a rotary converter, of means for deriving a current responsive, in direction and magnitude, to the unneutralized difference between the alternating current and the direct current of said rotary converter, said means comprising an auxiliary dynamo-electric machine, means for exciting said auxiliary machine, in direction and magnitude, in response to the alternating current of said rotary converter, and means for exciting said auxiliary machine, in direction and magnitude, in response to the direct current of said rotary converter, the two excitations normally substantially neutralizing each other when the load conditions of the rotary converter are not rapidly changing.

3. A rotary converter comprising main pole members and commutating pole members, direct-current and alternating-current leads, a main winding on said commutating pole members connected in series circuit relation to said direct-current leads, an auxiliary winding on said commutating pole members, and means for exciting said auxiliary winding, said means comprising an auxiliary dynamo-electric machine, means for exciting said auxiliary machine in response to the current in said alternating-current leads, and means for exciting said auxiliary machine in response to the current in said direct-current leads, the two excitations of said auxiliary machine normally substantially neutralizing each other when the load conditions of said rotary converter are not rapidly changing.

4. A rotary converter comprising main pole members and commutating pole members, direct-current and alternating-current leads, and means for exciting said commutating pole members, said means comprising an auxiliary dynamo-electric machine, exciting means for said auxiliary machine inherently operating to derive a unidirectional exciting flux from the current in said direct-current leads, and exciting means for said auxiliary machine inherently operating to derive an opposing unidirectional exciting flux from the current in said alternating-current leads.

5. A rotary converter comprising main pole members and commutating pole members, alternating-current and direct-current leads, and means for exciting said commutating pole members, said means comprising means inherently operating to derive a unidirectional flux from the current in said alternating-current leads and means inherently operating to derive a unidirectional flux from the current in said direct-current leads, the resultant commutating-pole excitation being such that the alternating-current and direct-current armature reactions in the commutating zones are each inherently neutralized substantially by the currents in the alternating-current and direct-current leads, respectively, notwithstanding momentary abnormal relations between the two armature reactions resulting from rapidly changing load conditions.

6. The combination with an alternating-current line and a synchronous dynamo-electric machine connected thereto, of an auxiliary dynamo-electric machine mechanically connected to said first-mentioned machine, said auxiliary machine being provided with a rotor winding having a commutator member and slip rings, means for supplying current to said slip rings from said alternating-current line whereby a flux stationary in space is produced by armature reaction, said auxiliary machine being also provided with direct-current stator exciting means for producing a flux substantially in alignment with said armature-reaction flux, and brushes bearing on said commutator member for deriving a unidirectional current substantially proportional to the algebraic sum of said two fluxes at any given speed of operation.

7. The combination with a variable-frequency system, of a dynamo-electric machine, said machine having a rotor winding having a commutator member and slip rings and a direct-current stator exciting winding, means for supplying current to said slip rings from said variable-frequency system, means for causing said machine to operate in synchronism with said variable-frequency system in such manner that the armature-reaction field produced by the slip-ring currents shall be substantially in alignment with the field produced by said direct-current exciting winding, and brushes bearing on said commutator member for deriving a unidirectional current substantially proportional to the product of the frequency and the algebraic sum of the two fields.

8. A system comprising a variable-frequency alternating-current circuit, a variable voltage direct current circuit, a rotary converter interconnected between said direct-current circuit and said alternating-current circuit, said rotary converter having interpole commutating windings, and electro-responsive means for variably exciting said commutating windings in accordance with changes in the ratio of the direct current to the alternating current in the rotary converter during sudden voltage or frequency changes.

9. A system comprising a variable-frequency alternating-current circuit, a variable-voltage direct-current circuit, a rotary converter interconnected between said direct-current circuit and said alternating-current circuit, said rotary converter having interpole commutating windings, and means for variably exciting said commutating windings in accordance with changes in the ratio of the direct current to the alternating current in the rotary converter during sudden voltage or frequency changes, said means comprising an auxiliary dynamo-electric machine mechanically connected to said rotary converter, means for exciting said auxiliary machine in response to the alternating current of said rotary converter, and means for exciting said auxiliary machine in response to the direct current of said rotary converter, the two excitations normally substantially neutralizing each other when the operating conditions of the rotary converter are not rapidly changing.

In testimony whereof, I have hereunto subscribed my name this 1st day of April, 1926.

ERNST KLOSS.